(12) United States Patent
Schubert et al.

(10) Patent No.: US 6,356,854 B1
(45) Date of Patent: Mar. 12, 2002

(54) HOLOGRAPHIC OBJECT POSITION AND TYPE SENSING SYSTEM AND METHOD

(75) Inventors: Peter James Schubert; Michelle Lee Copeland, both of Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/286,326

(22) Filed: Apr. 5, 1999

(51) Int. Cl.$^7$ .......................... G01B 11/00; G01B 9/021; G03H 1/00

(52) U.S. Cl. ...................... 702/150; 702/155; 702/159; 701/45; 701/49; 356/457; 356/458; 359/11; 359/30

(58) Field of Search ................................. 702/150–153, 702/155, 159, 171–172; 356/457–458, 508, 615; 359/9–11, 21, 22, 27–31; 701/45, 49

(56) References Cited

U.S. PATENT DOCUMENTS

| | | | |
|---|---|---|---|
| 4,174,179 A | | 11/1979 | Tschudi et al. |
| 5,138,489 A | * | 8/1992 | Park ............................ 359/561 |
| 5,339,305 A | * | 8/1994 | Curtis et al. ................... 359/29 |
| 5,378,888 A | * | 1/1995 | Stappaerts ................... 356/121 |
| 5,777,742 A | * | 7/1998 | Marron ........................ 356/458 |
| 5,889,593 A | * | 3/1999 | Bareket ....................... 356/445 |

FOREIGN PATENT DOCUMENTS

| | | |
|---|---|---|
| DE | 196 17 405 | 11/1996 |
| EP | 0 587 920 A | 3/1994 |
| EP | 0 788 947 A | 8/1997 |

OTHER PUBLICATIONS

Yoshinori Kajiki: "A construction of Pattern Classification System Using Direct–Drawn Computer–Generated Fourier Hologram"—Electronics & Communications in Japan Part II—Electronics, US, Scripta Technica. New York, vol. 73, No. 6, Jun. 1, 1990, pp. 11–21, XP000175241 ISSN:8756–663X.

* cited by examiner

*Primary Examiner*—Bryan Bui
(74) *Attorney, Agent, or Firm*—Robert M. Sigler (57) ABSTRACT

Systems and methods for determining the position and classification of an object and which may provide signals that control deployment of an active restraint device, for example. Using a pulsed laser light beam from a laser source that is spread and preferably diffused to avoid ocular damage, an interference pattern is returned to a sensing module through a spectral filter. There it is optionally combined with a reference beam from the laser source, modified to emulate coherence length effects, and incident upon a phase transmission holographic template that may be segmented into regions for example. Each region of the holographic template contains Fourier transform images of occupant types. Behind the holographic template is a detector array that is sensitive to the laser light. An interference pattern derived from the object is convoluted or cross-correlated with the template. When an match occurs, a bright spot appears on the detector array. The location of this spot within the region contains position information. The relative brightness and location of spots within each region provide information relative to their classification. Using fuzzy logic, neural networks, or an algebraic algorithm, this information is decoded, and a decision made as to the type and location of the object. With this information, a deployment algorithm for the active restraint device, in conjunction with other information, can make the appropriate choice on whether or not to deploy the device.

22 Claims, 5 Drawing Sheets

HOLOGRAPHIC OBJECT POSITION AND TYPE SENSING SYSTEM AND METHOD

TECHNICAL FIELD

The present invention relates to occupant position and type sensing systems and methods.

BACKGROUND OF THE INVENTION

Occupant type and position detection is an important technology for air-bag active restraint technology. Detecting occupant position within a vehicle is important for disabling active restraint devices, such as airbags, when such devices could endanger an occupant. For example, such technology may be used to prevent danger to out-of-position occupants, and certain types of car seats, such as a rear-facing infant seat. Numerous techniques have been proposed, ranging from weight-sensing, range finding using light or sound, electrostatic fields, thermal imaging, or visual pattern recognition, and a brief review of the conventional technology is presented below.

Weight-based sensing relies on load cells or pressure sensors mounted between the seat and floor of a vehicle, or within a seat cushion. Problems with weight-based sensing include effects of seatbelt cinching with car seats and rear-facing infant seats, requiring the use of additional sensors to detect this load. Out-of-position occupants also provide an exceedingly wide variety of weight patterns on any type of sensor or sensor array, making distinction between various categories a very challenging task. Occupants whose feet are on the floor or are raised will have vastly different sensed weights, yet may require the same treatment from the restraint technology. Vehicle bounce, occupant bounce, heavy objects in a seat, and many other complications make this technology very difficult to realize, although system costs can be kept very low.

Ranging systems using ultrasonic time-of-flight sensing such as is disclosed in International Patent B60R 21/16 by Breed can provide a quasi-one-dimensional profile of the occupant. However, this requires either many beams, with attendant high costs, or a scanning beam, with reliability risks and noise issues related to the motor required. Physical parameters of the cockpit space affecting the speed of sound, such as temperature, humidity, dust, thermal gradients, and other disturbances provide significant technical challenges, requiring additional compensation methods.

Sound-based ranging also has a lower limit on the rapidity with which changes to the occupant position can be detected. Environmental noise from normal events like loud music, jangling keys, wind noise, and so forth, can easily dominate the ultrasonic signal, affecting the signal-to-noise ratio, and providing spurious signals, leading to possible false alarms. Poor reflection from ultrasonics on many types of fabrics, or angles of fabrics, causes significant loss of signal, so that the sensor system is blind to many important cases. The wide range of possible occupant positions, types, coverings, and the like, make a quasi-one-dimensional algorithm with 100% recognition capability across all requirements very demanding, requiring costly memory and processing overhead.

Ranging using triangulation with infrared light beams disclosed in U.S. Pat. No. 5,785,347 by Adolph. et al., provides a quasi-one-dimensional profile, similar to an ultrasonic method. Light beams can be sensed more quickly, and can be made less susceptible to environmental noise. Poor reflection and shadowing are serious problems with this technique, as many materials absorb or scatter infrared signals. The cost of an infrared system tends to be high since a plurality of optical devices are needed, and must be aligned properly, often at difficult angles for a manufacturing process. Unlike ultrasonic technology, where the same device operates as transmitter and receiver, the infrared system requires aseparate light source and light sensing device.

Electrostatic occupant detection disclosed in U.S. Pat. No. 5,802,479 issued to Kithil, et al. is a simple concept, relying on the relatively high moisture content of a human body to provide a capacitance signal to a suitable sensor or array of sensors placed to locate an occupant. The electronics and algorithm are very modest, and the resolving capability depends on the number of sensors used. Also, external electromagnetic noise sources can interfere with the operation of this system, and many dielectric and metallic objects that appear in vehicle cockpits can cause faulty signals. Electrostatic detection is often used as an adjunct technology to ranging or pattern recognition systems.

Optical pattern recognition holds promise for occupant detection. However, system costs associated with optics and image processing hardware and software are considerable higher and more difficult than ranging or weight-based sensing. Wide variations in lighting levels and contrasts make this job more difficult in the environment seen by a vehicle cockpit. Sensitivities and degradation due to surface film accumulation can affect the system response over time. From the two-dimensional image produced, the software must detect not only edges, but compare patterns with existing templates, stored in memory. This is expensive, and suffers from shadowing effects, and suffers from the wide variation of objects and positions possible in a vehicle interior. The potential for performance with optical pattern recognition is greater than ranging or electrostatics, but until component costs are considerably cheaper and software techniques more advanced, this will remain unfavorable for high volume applications.

Accordingly, it would be advantageous to have occupant position and type sensing systems and methods that overcome the limitations and disadvantages of conventional systems and methods.

SUMMARY OF THE INVENTION

The present invention provides for holographic occupant position and type sensing systems and methods that may be used in vehicular applications, and the like. An exemplary system comprises a light source that generates a pulsed light beam. A beam splitter separates the pulsed light beam into reference and object beams.

A holographic template comprising a plurality of phase patterns receives the reference beam and a reflected object beam that is reflected from an object. Interference between the reference beam and the reflected object beam interact with phase patterns present on the template, and convolution between the beam interference and the phase pattern produces a spot of light when there is an exact match. The brightness of the spot indicates the degree of match and the location of the spot indicates the spatial location of the object.

A two-dimensional detector array detects the magnitude and location of the spot and for outputting signals indicative thereof. A processor processes the signals indicative of the magnitude and location of the spot to generate an output signal indicative of the position of the object and a classification of the object as one of a predetermined number of types of objects.

The method of occupant position and type sensing in accordance with the present invention uses a holographic template to hold a Fourier transform of various images to be recognized. By convolving an interference pattern of the target with this template, a simple charge-coupled device imaging array or CMOS imaging device rapidly determines type and position in a plane of a three-dimensional object.

The system, which is preferably mounted in an overhead console of a vehicle, scans a three-dimensional surface, thus providing two-dimensional information about an object. This is very important, since the location in a plane of an occupant, car-seat, or other object can have almost any location. Processing of raw two-dimensional information is greatly facilitated by the use of the template, wherein numerous images can be stored simultaneously.

The templates, once created, can be mass produced at very low cost, thus providing a very high ratio of information content to component cost. Because of the method of optical processing used in the present invention, the computation requirements for the system are very modest, and the determination of position and class can be made very quickly, faster than ultrasonic or vision-based optical pattern recognition.

There are no moving parts in the system, and optical alignment requirements are very modest compared to infrared or optical pattern recognition systems. Because laser light is highly monochromatic, filters can easily remove any environmental light noise. A key feature of holography is that loss of signal, dust particles, surface films, and other sources of degradation cause a graceful decline in detection, since holographic information is distributed across the media. This is an important advantage over each of the prior art methods described in the Background section. Overall, the present holographic sensing system and method offers high performance with low cost and high reliability, thus meeting the need for vehicle systems in a wide variety of applications, including occupant position and type sensing for active restraint technologies.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
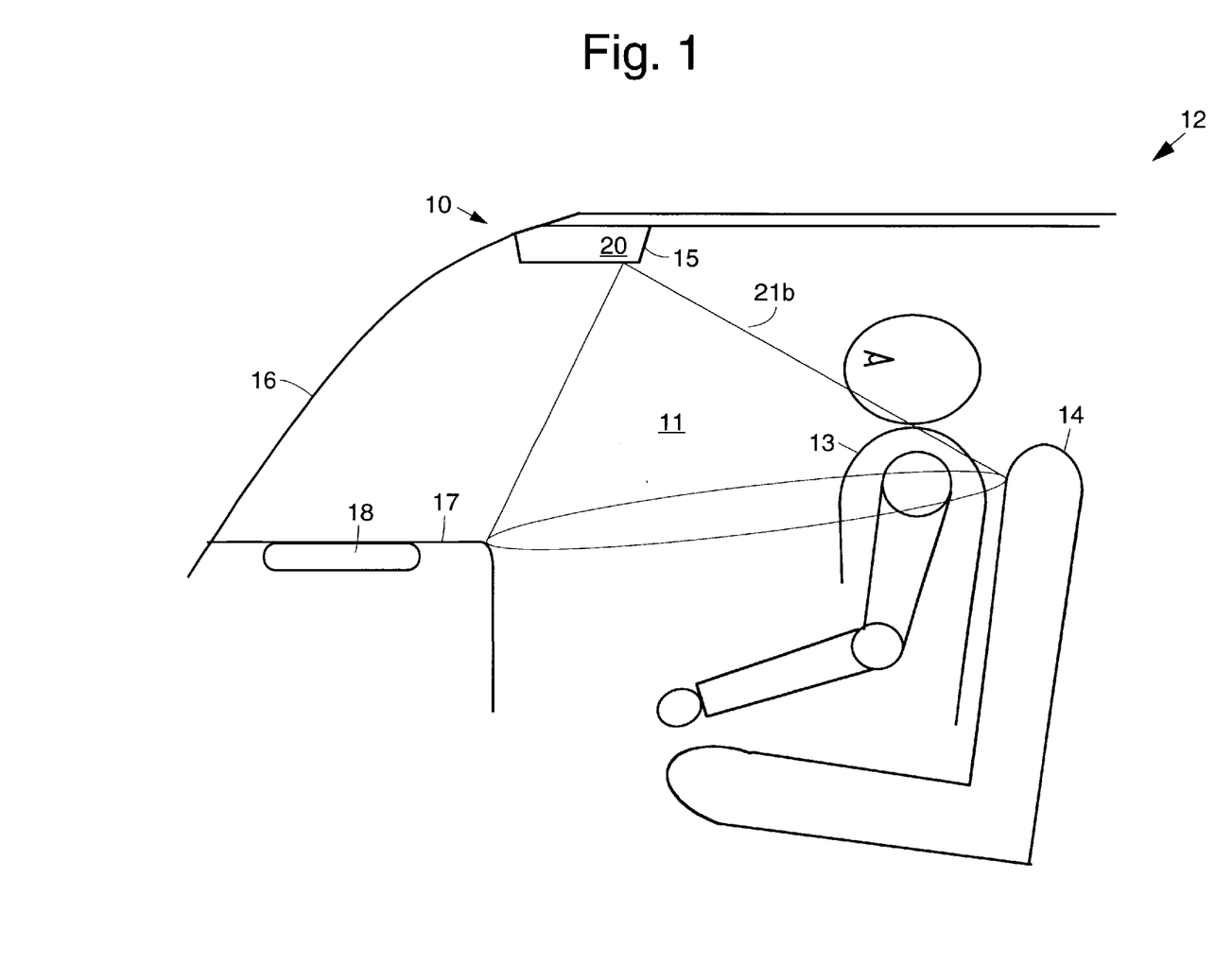
FIG. 1 illustrates an embodiment of an exemplary holographic occupant position and type sensing system in accordance with the principles of the present invention installed in a cockpit of a vehicle.

Referring to the drawing figures, FIG. 1 illustrates an embodiment of an exemplary holographic occupant position and type sensing system 10 in accordance with the principles of the present invention installed in a cockpit 11 of a vehicle 12. FIG. 1 shows a side view of the vehicle cockpit 11 with an occupant 13 seated normally in a seat 14, and with the system 10 mounted in an overhead console 15. The vehicle 12 has a windshield 16, a dashboard 17 and passenger airbag 18.

Figure 2:
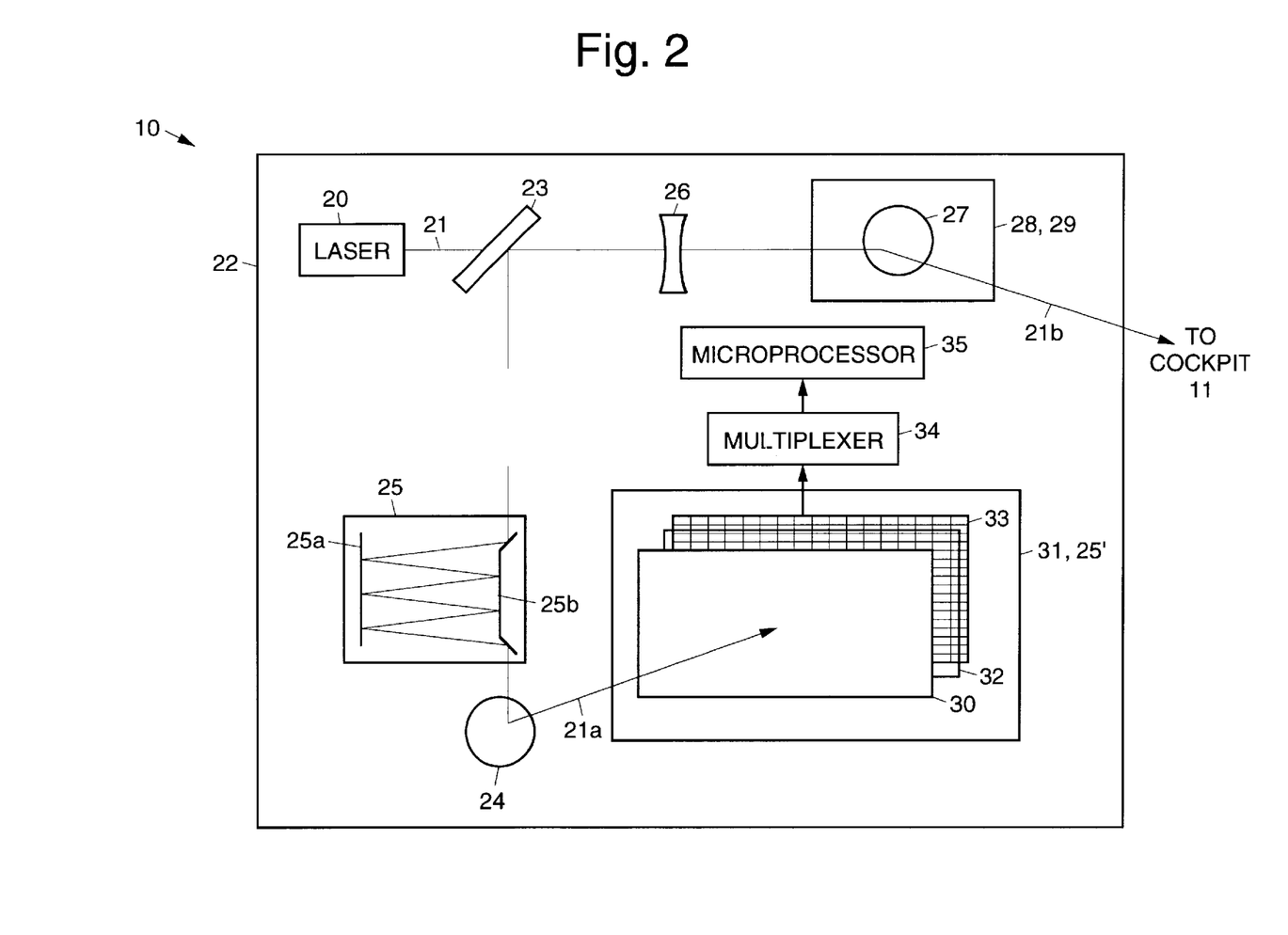
FIG. 2 is a schematic of the holographic occupant position and type sensing system.

A light source 20, such as a laser source 20, for example outputs a beam 21 (FIG. 2) that is split to produce a reference beam 21a (FIG. 2) and an object beam 21b (FIGS. 1 and 2). The object beam 21a derived from the laser source 20 is spread and diffused emerges from the overhead console 15, and bathes the occupant 13 or object 13 in laser light. Spreading of the object beam 21a reduces the laser power per unit area, while simultaneously covering a solid angle of the cockpit 11 including areas of interest (i.e., the seat 14, the occupant 13 or object 13, and a deployment region of an active restraint). The diffusion of the object beam 21a reduces the overall power so that the laser light cannot damage human eyes. The object beam 21a is pulsed, which serves to freeze the image, with a pulse width designed so that movements of the occupant 13 or object 13 are preferably less than one-half wavelength of the laser light.

The object beam 21a reflects from the target area, which includes the seat 14 and the occupant 13 or object 13 located in the seat 13 and the dash-board 17, and a portion returns to the overhead console 15, carrying information in reflected wavefronts. This information contains pattern, orientation and location-in-a-plane information about each point from which a direct line of sight exists from the console 15 to the occupant 13 or object 13 and back again, within a solid cone determined by a beam spreader 26 and spreading mirror 27 (FIG. 2). A spectral or spectral filter 31 (FIG. 2) collects the light, while screening out other wavelengths of light. A preferred wavelength is in the infrared to far infrared region. Longer wavelengths allow longer pulses of laser light, and also have lower photon energy, further reducing possible damage to human eyes, and longer wavelengths also reduce sensitivity to movements of occupants 13.

FIG. 2 is a schematic showing details of the exemplary holographic occupant position and type sensing system 10 depicted in FIG. 1. FIG. 2 shows a preferred embodiment of a module 22 that houses optics and electronics of the system 10. The laser source 20 is preferably a semiconductor diode laser 20 having a high coherence length, and a long mean-time-between-failures reliability rating, able to operate with pulse widths less than about 1 ms, and a preferred duty cycle about or less that ten percent.

A beam splitter 23 separates the laser pulse into reference and object beams 21a, 21b. The object beam 21b travels outside the module 22, to the target (occupant 13 or object 13), and back. The reference beam 21a remains within the module 22, and is used to create an interference pattern with the reflected object beam 21b at a transparent holographic template 30, and in particular a transmission phase holographic template (TPHT) 30. An alternative implementation uses a Fourier lens and a Fourier transform template in place of the TPHT 30.

It is to be understood that the beam splitter 23 and reference beam is not required for all applications. Consequently, the use of the beam splitter 23 and reference beam is not absolutely required and is disclosed herein for the purpose of illustrating a preferred embodiment of the system 10.

The significance of the coherence length is that this is the upper desired range allowable in travel distances between the reference beam 21b and the object beam 21a. It is preferred that the coherence length be greater than two meters for applications within the vehicle cockpit 11. However, if costs, size, or power requirements dictate that a lower coherence length be used, then a coherence matching device 25 is required.

After the beam splitter 23, the reference beam 21a enters the coherence matching device 25 comprising a coherence modification unit 25 to make it's coherence degradation commensurate with the object beam 21b. An alternative coherence matching device 25 may employ aspherical microlenses, for example. The coherence matching device 25 is only required for lower coherence lengths, and thus is not required for all embodiments of the system 10. This may be done by causing multiple reflections between two mirrors 25a, 25b oriented slightly off-parallel, or through a slab of optical material designed to introduce a controlled amount of incoherence. The tradeoffs between a high coherence length and the need for a coherence matching device are such that either embodiment may be employed in the present invention. The reference beam 21a is reflected off of a curved mirror 24 onto the TPHT 30.

The object beam 21b passes through a beam spreader 26 and a spreading mirror 27. The beam spreader 26 opens the substantially collinear beam up to subtend a solid cone. Then the spreading mirror 27 further spreads the object beam 21b and re-directs it in the appropriate direction interior to the cockpit 11 of the vehicle 12. The exit path from the module 22 preferably includes a frosted glass or similar diffusion mechanism 28, to reduce the laser power such that eye damage does not occur. Depending on system parameters, including detection limits, this diffusion mechanism 28 may not be required. Both options may be employed in embodiments of the present invention.

Also, it may be possible to combine the functions of the beam spreader 26 and the spreading mirror 27, thus eliminating one component. Such a combined component requires tighter variation tolerances, and requires more critical alignment during manufacture. Either embodiment may be preferable, depending upon the system requirements, and may be readily employed in the present invention. An output filter 29 may be used at the exit aperture, to prevent ambient light from entering the module 22.

Reflected incoming light rays from the object 21b enter the module 22 through the spectral filter 31. The width of the bandpass of the spectral filter 31 should be as small as possible around the laser wavelength without appreciably attenuating light intensity. The spectral filter 31 may also be provided in for form of a lens, so that a relatively wider window of view can be obtained within a smaller area, and collecting more photons. Use of the lens spectral filter 31 is a design tradeoff between the signal detection limits, the angle of view desired, and other constraints, and is an adjustable feature of the present invention.

Upon returning to the enclosed environment of the module 22 (which is enclosed to keep out contamination), the object beam 21b impinges upon the transmission phase holographic template (TPHT) 30. The reference beam 21a, after passing through an optional coherence matching device 25', if required, is directed onto the TPHT 30. Interference between the reference beam 21a and the object beam 21b interact with phase patterns present on the TPHT 30. The convolution between the beam interference pattern and the phase pattern on the TPHT 30 produce a bright spot of light when there is an exact match. The brightness of the spot indicates the degree of match. The location of the spot indicates the spatial location of the object 13 which has been recognized.

A two-dimensional detector array 33, such as a charge-coupled device (CCD) array 33 or CMOS imaging device 33 (which is relatively inexpensive compared to the CCD array 33), for example, which is sensitive to the laser light frequency then detects the spot magnitude and location. In the case of the CCD array 33, this information is provided via a multiplexer 34 to a processor 35, such as a microprocessor, for example, capable of translating this information into a useful form. In the case of the CMOS imaging device 33, row and column addressing is typically done on-chip, so the multiplexer is not required.

For example, an algorithm implemented in the microprocessor 35 may be used to determine that if the object 13 matches a properly-seated adult, then it is acceptable to deploy a passenger airbag, should circumstances dictate it is desirable to do so. Another example, is that if the presence of a rear-facing infant seat is detected, then the passenger airbag should be disabled.

The algorithm may be implemented using fuzzy logic, neural networks, or a simple algebraic algorithm run on the microprocessor 35. Using such an algorithm, the information regarding the spot is decoded, and a decision may be made as to the type and location of the object 13.

Figure 3:
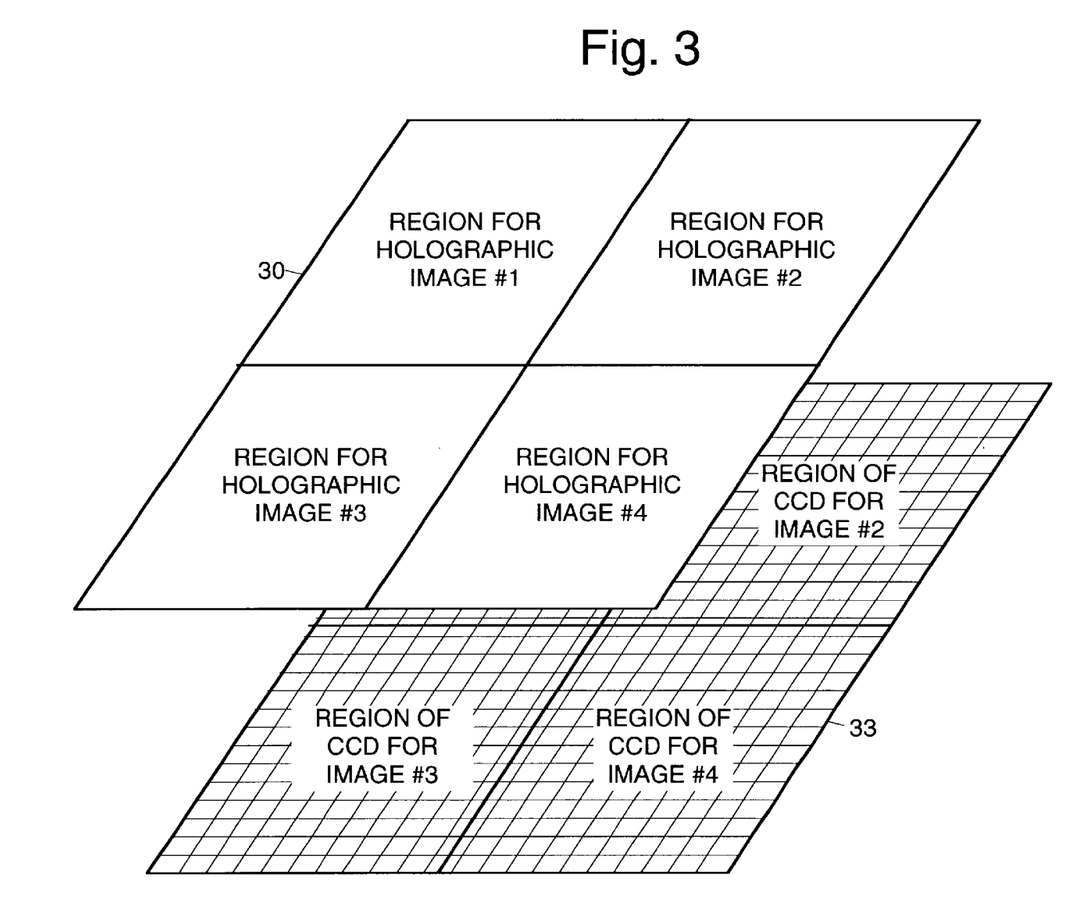
FIG. 3 illustrates a holographic template and detector array employed in the system of FIG. 2.

FIG. 3 illustrates segmentation of the TPHT 30 into various regions for the purpose of identifying multiple targets (occupants 13 or objects 13). There are two ways to accomplish this. For simplicity sake, the TPHT 30 is simply divided into four sectors, or regions, for example, each containing the interference pattern for a prototypical classification or type of object 13. Each region of the holographic template contains Fourier transform images of types of objects 13 or occupants 13 (including an empty seat). The number of sectors can increase, but the light intensity and spatial resolution will decrease.

Another way to put multiple images on the TPHT 30 is to arrange them in different orientations around an axis through the center of the TPHT 30. In this way, multiple images are stored on top of each other, but are separated by polarization. In this case, the reference beam is polarized in such a way that all the angles of polarization are controllable, so that different images can be detected. This may be accomplished with a rotating diffraction grating or Polaroid filter, timed to the laser pulse. A more reliable way is to use an optical element that induces a rotation to the polarization of the reference beam 21a, and using one image on the TPHT 30 to time the succession of the various holographic interference images, and the pulsing of the laser light to coincide with the rotating polarization.

As is shown in FIG. 3, the TPHT 30 is divided into four sectors, for example. The incoming object beam 21b impinges upon the entire surface of the TPHT 30. The CCD array 33 or CMOS imaging device 33 beneath the TPHT 30 is also segmented. Thus, there will be, in general, four spots of various magnitude and location within their respective arrays. Once these are multiplexed by the multiplexer 34, if necessary, and sent to the microprocessor 35, the relative membership within each type or classification can be determined.

The microprocessor 35 processes the signals indicative of the magnitude and location of the spot in accordance with the algorithm to generate output signals indicative of the position of the object and classification of the object as one of a predetermined number of types of objects 13, such as an adult, a child, or a non-human object 13, for example. The spatial location may be determined from the spot location within the segment of the array 33. With this information, the algorithm embodied in the microprocessor 35 determines which signal to send to the active restraint deployment algorithm. For example, if a child is detected, but at a location very close to a passenger airbag deployment zone, then a signal would be sent indicating that the passenger airbag should be disabled.

The number of sectors used will depend on system requirements. In general, the more segments, the more types can be recognized, but with less spatial resolution, and greater opportunity for conflicting signals. A suitable tradeoff between accuracy, resolution, and ability to generalize exists, and must be decided by the user of the present invention. The number of sectors can range from one to a very high number, and this whole range is considered embodied by the present invention.

Figure 4:
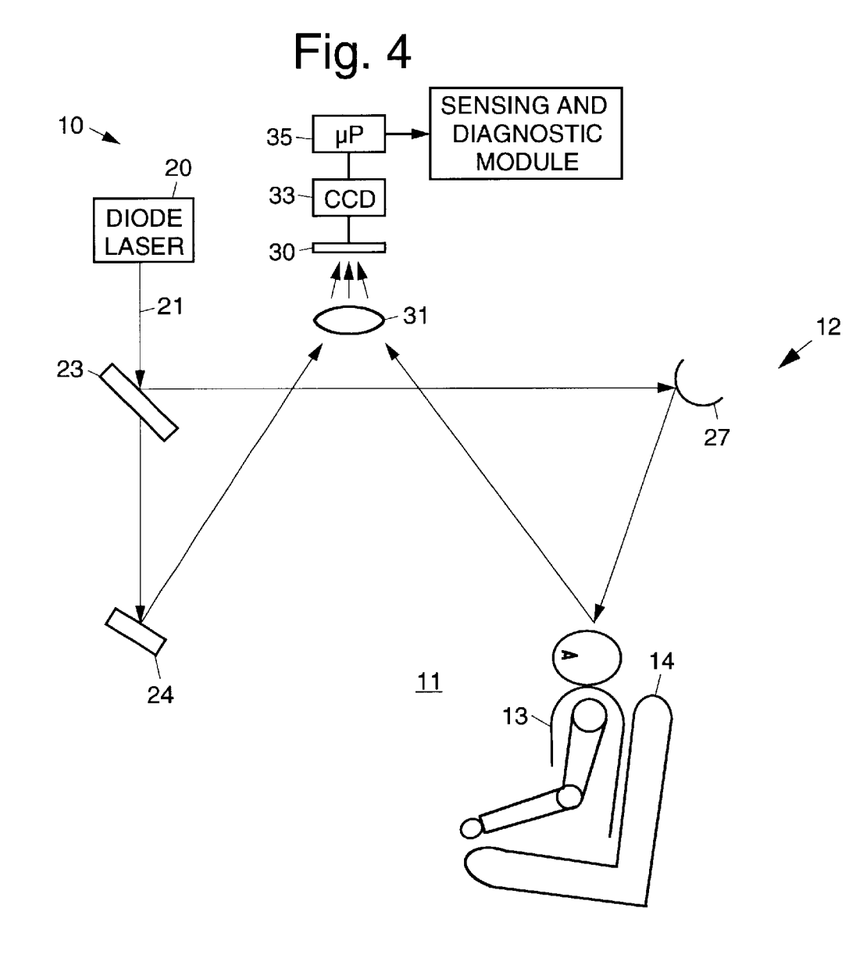
FIG. 4 an exemplary implementation of the present holographic occupant position and type sensing system.

FIG. 4 an exemplary implementation of the present holographic occupant position and type sensing system 10. A diode laser 20 emits a beam 21 that impinges upon the beam splitter 23 to produce the reference beam 21a and the object beam 21b. The reference beam 21a is reflected from a mirror 24 and through an input lens 32 and the TPHT 30 and onto an analyzing integrated circuit chip 33 comprising the CCD array 33 or CMOS imaging device 33. The object beam 21b is reflected from a ball-type output mirror 27 into the cockpit 11 of the vehicle 12. The object beam 21b is reflected from objects 13 in the cockpit 11 and are imaged by the input lens 32 onto the TPHT 30 and onto the CCD analyzing chip 33.

Interference between the reference beam 21a and the object beam 21b interact with phase patterns present on the TPHT 30. The convolution between the beam interference and the phase pattern on the TPHT 30 produce a bright spot of light when there is an exact match. The brightness of the spot indicates the degree of match. The location of the spot is indicative of the spatial location of the object 13 that has been recognized.

The output of the CCD analyzing chip 33 is multiplexed and input to the microprocessor 35 which contains the pattern recognition algorithm. The pattern recognition algorithm is used to compare the locations of spots detected by the CCD analyzing chip 33 to predetermined patterns representing different types of objects 13. The algorithm determines which object type is present in a particular seat 14, for example, and outputs a signal that is sent to a sensing and diagnostic module (SDM) to enable or suppress active restraint measures, such as to control deployment of the airbag 18, for example.

From the above, it can be seen that the present invention provides for an improved object position and type sensing system 10. The system 10 has no moving parts, may be enclosed in a dust-free optical module 22 or case, is insensitive to environmental disturbance, is harmless to occupants 13, has modest electronic needs, very rapidly generates position and classification information, uses simple decision logic, is highly reliable, and may be packaged to fit within a small space.

Figure 5:
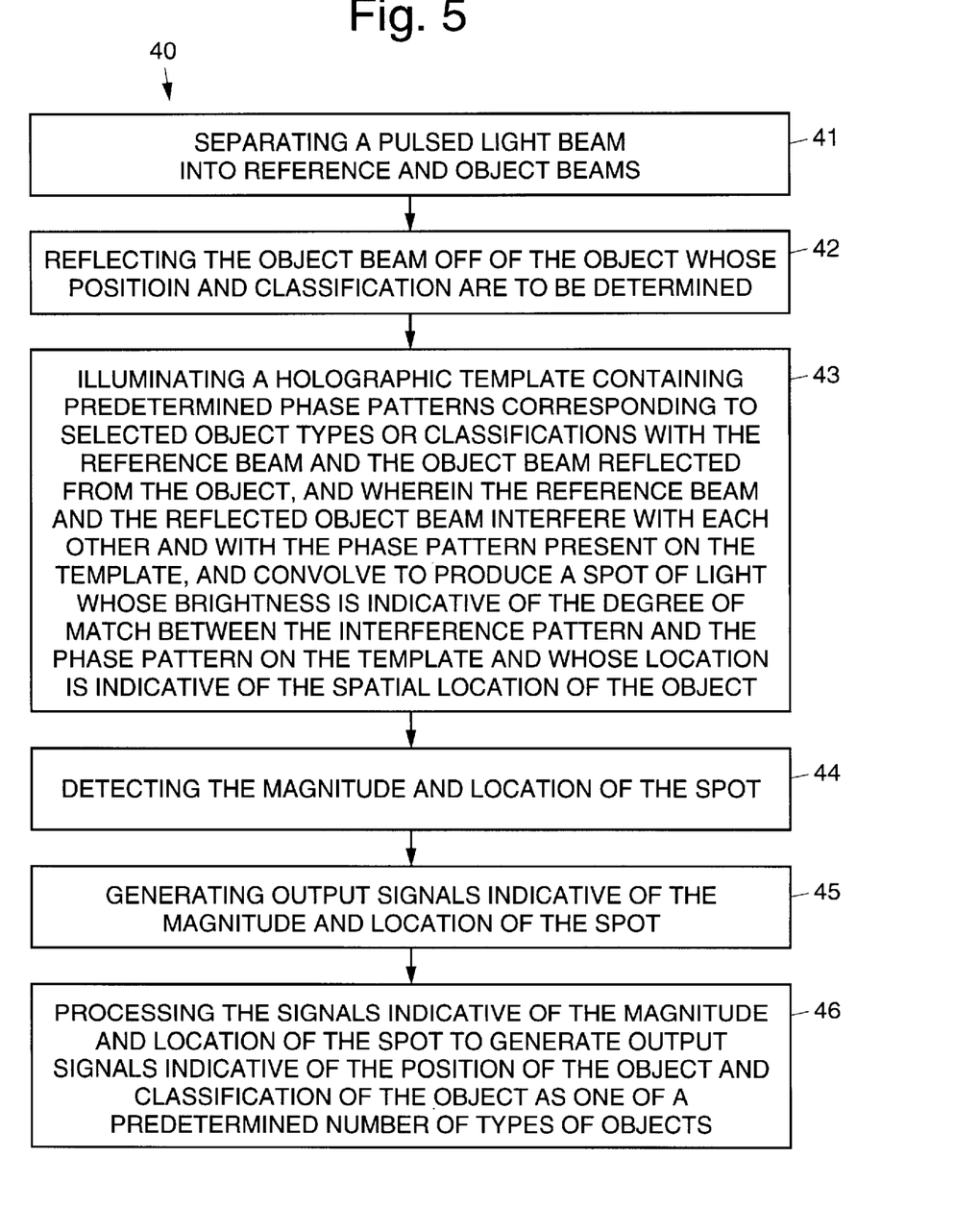
FIG. 5 is a flow diagram that illustrates an exemplary method in accordance with the principles of the present invention.

Referring now to FIG. 5, it is a flow diagram that illustrates exemplary methods 40 in accordance with the principles of the present invention. The exemplary methods 40 comprise the following steps.

A pulsed light beam is generated 41 produce an object beam 21b. Alternatively, the pulsed light beam is separated 41a into reference and object beams 21a, 21b. The object beam 21b is reflected 42 off of an object whose position and classification are to be determined. An object beam 21b reflected from the object 13 is caused to illuminate 43 a holographic template 30 containing predetermined phase patterns corresponding to selected object types or classifications, such as an adult, a child, a child seat, or other selected object 13. In the alternative, the reference beam 21a and the reflected object beam 21b are caused to illuminate 43 the holographic template 30.

The reflected object beam interferes with the phase pattern present on the template 30, and convolves to produce a spot of light whose brightness is indicative of the degree of match between the interference pattern and the phase pattern on the template. Alternatively, the reference beam and the reflected object beam interfere with each other and with the phase pattern present on the template 30, and convolve to produce the spot of light, and whose brightness is indicative of the degree of match between the interference pattern and the phase pattern on the template 30. The location of the spot is indicative of the spatial location of the object 13.

The magnitude and location of the spot is detected 44 and output signals indicative thereof are generated 45. The signals indicative of the magnitude and location of the spot are processed 46 to generate an output signal indicative of the position of the object 13 and a classification of the object 13 as one of a predetermined number of types of objects 13.

Thus, improved holographic occupant position and type sensing systems and methods have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A holographic object position and type sensing system comprising:

a light source for outputting a pulsed light beam comprising an object beam;

a holographic template comprising phase patterns for receiving an object beam that is reflected from an object, and wherein the reflected object beam interferes with the phase patterns present on the template, and convolution between the beam interference and the phase pattern produces a spot of light when there is an exact match, and wherein the brightness of the spot indicates the degree of match and the location of the spot indicates the spatial location of the object;

a two-dimensional detector array for detecting the magnitude and location of the spot and for outputting signals indicative thereof; and a processor for processing the signals indicative of the magnitude and location of the spot to generate and output signal indicative of the position of the object and a classification of the object, wherein the holographic template comprises a plurality of interference patterns arranged at different polarization angles around an axis through the center of the template, which plurality of interference patterns are indicative of both the classification and spatial location of the object.

2. The system recited in claim 1 wherein the light source comprises a laser source.

3. The system recited in claim 1 wherein the light source comprises a semiconductor diode laser.

4. The system recited in claim 3 wherein the semiconductor diode laser has a high coherence length, and a pulse width less than about 1 ms and a duty cycle less than about ten percent.

5. The system recited in claim 1 further comprising a beam spreader and a spreading mirror for spreading the object beam and reflecting it onto the object.

6. The system recited in claim 1 wherein the holographic template is segmented into a plurality of regions that contain different interference patterns that identify multiple different object types.

7. The system recited in claim 1 further comprising a beam splitter for separating the pulsed light beam into reference and object beams;

and wherein the holographic template comprises phase patterns for receiving the reference beam and a reflected object beam that is reflected from and object, and wherein the reference beam and the reflected object beam interfere with phase patters present on the template, and convolution between the beam interference and the phase pattern produces a spot of light when there is an exact match, and wherein the brightness of the spot indicates the degree of match and the location of the spot indicates the spatial location of the object.

8. The system recited in claim 7 further comprising a coherence modification unit that degrades the coherence of the reference beam to be commensurate with the coherence of the object beam.

9. The system recited in claim 7 wherein the reference beam is polarized and the holographic template comprises a rotating diffraction grating containing the plurality of interference patterns whose rotation is timed to the laser.

10. The system recited in claim 7 wherein the reference beam is polarized and the holographic template comprises a rotating Polaroid filter containing the plurality of interference patterns whose rotation is timed to the laser pulse.

11. The system recited in claim 1 wherein the holographic template comprises at least one phase pattern indicative of the classification and spatial location of the occupant of a vehicle seat.

12. A method for determining the position and classification of an object, comprising the steps of:

generating a pulsed light beam comprising an object beam;

reflecting the object beam off an object whose position and classification are to be determined;

illuminating a holographic template containing predetermined phase patterns corresponding to selected object types with an object beam reflected from the object, and wherein the reflected object beam interferes with the phase pattern present on the template, which convolves to produce a spot of light whose brightness is indicative of the degree of match between the interference pattern and the phase pattern on the template and whose location is indicative of the spatial location of the object;

detecting the magnitude and location of the spot;

generating signals indicative of the magnitude and location of the spot;

processing the signals indicative of the magnitude and location of the spot to generate output signals indicative of the position of the object and classification of the object; and further processing the output signals to determine whether to enable or suppress active restraint measures.

13. The method recited in claim 12 wherein the step of processing the signals generates output signals indicative of the classification of the object, which corresponds to one of the predetermined phase patterns of the holographic template.

14. The method recited in claim 12 wherein the pulsed light beam comprises a pulsed light beam comprises a pulsed laser beam derived from a laser source.

15. The method recited in claim 14 wherein the pulsed laser beam has a pulse width less than about 1 ms and a duty cycle less than about ten percent.

16. The method recited in claim 14 further comprising the steps of:

separating the pulsed light beam into reference and object beams; and illuminating the holographic template with the reference beam and the object beam reflected from the object, and wherein the reference and reflected object beams interfere with the phase pattern present on the template, and convolve to produce a spot of light whose brightness is indicative of the degree of match between the interference pattern and the phase pattern on the template and whose location is indicative of the spatial location of the object.

17. A holographic object position and type sensing system for determining a presence and position of portion of an occupant in a vehicle seat comprising:

a light source for outputting a pulsed light beam comprising an object beam;

a holographic template comprising phase patterns for receiving an object beam that is reflected from an object, and wherein the reflected object beam interferes with the phase patterns present on the template, and convolution between the beam interference and the phase pattern produces a spot of light when there is an exact match, and wherein the brightness of the spot indicates the degree of match and the location of the spot indicates the spatial location of the object;

a two-dimensional detector array for detecting the magnitude and location of the spot and for outputting signals indicative thereof; and a processor for processing the signals indicative of the magnitude and location of the spot to generate and output a signal indicative of the position of the object and a classification of the object, wherein at least one of the phase patterns of the template is indicative of the classification and spatial location of the occupant of a vehicle seat relative to an active restraint.

18. A system as recited in claim 17 wherein the active restraint is an airbag.

19. A system as recited in claim 17 further comprising control means for the activation of the active restraint responsive to the output signal indicative of the position of the object and classification of the object.

20. A system as recited in claim 18 wherein the active restraint is an airbag.

21. A holographic object position and type sensing system for determining a presence and position of portion of an occupant in a vehicle seat comprising:

a light source for outputting a pulsed light beam comprising an object beam;

a holographic template comprising phase patterns for receiving an object beam that is reflected from an object, and wherein the reflected object beam interferes with the phase patterns present on the template, and convolution between the beam interference and the phase pattern produces a spot of light when there is an exact match, and wherein the brightness of the spot indicates the degree of match and the location of the spot indicates the spatial location of the object;

a two-dimensional detector array for detecting the magnitude and location of the spot and for outputting signals indicative thereof; and a processor for processing the signals indicative of the magnitude and location of the spot to generate and output a signal indicative of the position of the object and a classification of the object and determining, responsive to the output signal, whether to enable or suppress active restraint measures associated with the vehicle seat.

22. A system as recited in claim 21 wherein the holographic template comprises a plurality of regions with phase patterns, at least one of the regions having a phase pattern corresponding to a type of occupant for which an active restraint activation is desired and another of the regions having a phase pattern corresponding to a type of occupant for which an active restraint activation is not desired.

* * * * *